(12) United States Patent
Beers et al.

(10) Patent No.: US 10,132,327 B2
(45) Date of Patent: *Nov. 20, 2018

(54) WELD REPAIR FOR CABIN AIR COMPRESSOR HOUSING

(71) Applicant: Hamilton Sundstrand Corporation, Windsor Locks, CT (US)

(72) Inventors: Craig M. Beers, Wethersfield, CT (US); Clarence J. Wytas, Stafford Springs, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 329 days.

This patent is subject to a terminal disclaimer.

(21) Appl. No.: 14/995,937

(22) Filed: Jan. 14, 2016

(65) Prior Publication Data

US 2017/0204873 A1    Jul. 20, 2017

(51) Int. Cl.

| | |
|---|---|
| *F04D 29/42* | (2006.01) |
| *B64F 5/40* | (2017.01) |
| *B64D 13/06* | (2006.01) |
| *F04D 29/056* | (2006.01) |
| *B64D 13/02* | (2006.01) |
| *F04D 29/62* | (2006.01) |

(52) U.S. Cl.
CPC ......... *F04D 29/4206* (2013.01); *B64D 13/02* (2013.01); *B64D 13/06* (2013.01); *B64F 5/40* (2017.01); *F04D 29/056* (2013.01); *F04D 29/624* (2013.01); *F05B 2230/10* (2013.01); *F05B 2230/232* (2013.01); *F05B 2230/70* (2013.01)

(58) Field of Classification Search
CPC .. F04D 29/4206; F04D 29/056; F04D 29/624; F04D 29/057; F04D 29/102; F04D 29/0513; F04D 29/5806; F04D 29/584; F05B 2230/10; F05B 2230/232; F05B 2230/70; B64F 5/40; B64D 13/02; B64D 13/06

See application file for complete search history.

(56) References Cited

U.S. PATENT DOCUMENTS

| | | | |
|---|---|---|---|
| 4,480,475 A * | 11/1984 | Tsao ................... | B23K 9/0956 219/130.21 |
| 7,367,122 B2 * | 5/2008 | Yip ....................... | B23P 6/002 277/415 |
| 7,402,020 B2 | 7/2008 | Beers et al. | |

(Continued)

*Primary Examiner* — Logan Kraft
*Assistant Examiner* — Eric Zamora Alvarez
(74) *Attorney, Agent, or Firm* — Kinney & Lange, P.A.

(57) ABSTRACT

A method for repairing a cabin air compressor outlet housing includes removing a journal bearing support sleeve in a cabin air compressor outlet housing, positioning a cylindrical insert within the cabin air compressor outlet housing, wherein the cylindrical insert has an outer diameter greater than an outer diameter of at least one portion of the removed journal bearing support sleeve, an inner diameter less than an inner diameter of at least one portion of the removed journal bearing support sleeve, and a length greater than a length of the removed journal bearing support sleeve, welding the cylindrical insert to the cabin air compressor outlet housing, and machining the welded cylindrical insert to form a replacement journal bearing support sleeve.

14 Claims, 10 Drawing Sheets

(56) References Cited

U.S. PATENT DOCUMENTS

| | | | |
|---|---|---|---|
| 8,272,129 B2 | 9/2012 | Kersteman | |
| 8,418,495 B2* | 4/2013 | Merritt | B64D 13/06 |
| | | | 415/216.1 |
| 8,475,114 B2* | 7/2013 | Rosen | F16C 3/02 |
| | | | 29/889.1 |
| 8,821,113 B2 | 9/2014 | Richardson et al. | |
| 9,243,643 B2 | 1/2016 | Beers et al. | |
| 2005/0061655 A1* | 3/2005 | Gros | C08G 18/792 |
| | | | 204/157.6 |
| 2012/0114463 A1* | 5/2012 | Beers | F04D 25/0606 |
| | | | 415/151 |
| 2013/0078090 A1* | 3/2013 | Beers | F01D 25/16 |
| | | | 415/230 |
| 2014/0030070 A1* | 1/2014 | Beers | F04D 25/082 |
| | | | 415/170.1 |
| 2014/0301830 A1 | 10/2014 | Beers et al. | |
| 2016/0169056 A1* | 6/2016 | Luick | F01L 1/047 |
| | | | 29/888.1 |

* cited by examiner

WELD REPAIR FOR CABIN AIR COMPRESSOR HOUSING

BACKGROUND

Air cycle machines are used in environmental control systems in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressured air sufficiently that it must be cooled, even if the ambient air temperature is very low. Thus, under most conditions, heat must be removed from air by the air cycle machine before the air is delivered to the aircraft cabin.

A cabin air compressor can be used to compress air for use in an environmental control system. The cabin air compressor includes a motor to drive a compressor section that in turn compresses air flowing through the cabin air compressor. The cabin air compressor includes a journal bearing and a journal bearing support sleeve as part of the compressor outlet housing. Motor failure, misalignment, or bearing failure can result in damage to the journal bearing support sleeve. Replacing the compressor outlet housing can be expensive.

SUMMARY

In one embodiment, a method for repairing a cabin air compressor outlet housing includes removing a journal bearing support sleeve in a cabin air compressor outlet housing, positioning a cylindrical insert within the cabin air compressor outlet housing, wherein the cylindrical insert has an outer diameter greater than an outer diameter of at least one portion of the removed journal bearing support sleeve, an inner diameter less than an inner diameter of at least one portion of the removed journal bearing support sleeve, and a length greater than a length of the removed journal bearing support sleeve, welding the cylindrical insert to the cabin air compressor outlet housing, and machining the welded cylindrical insert to form a replacement journal bearing support sleeve.

In another embodiment, a cabin air compressor housing includes a volute wall attached to and extending radially outward from an annular support ring, a web extending radially inward from the annular support ring, and a journal bearing support sleeve welded to a radial innermost portion of the web, wherein the journal bearing support sleeve was formed by machining an oversized cylindrical insert to final dimensions of the journal bearing support after the oversized cylindrical insert had been welded to the web.

DETAILED DESCRIPTION

Figure 1:
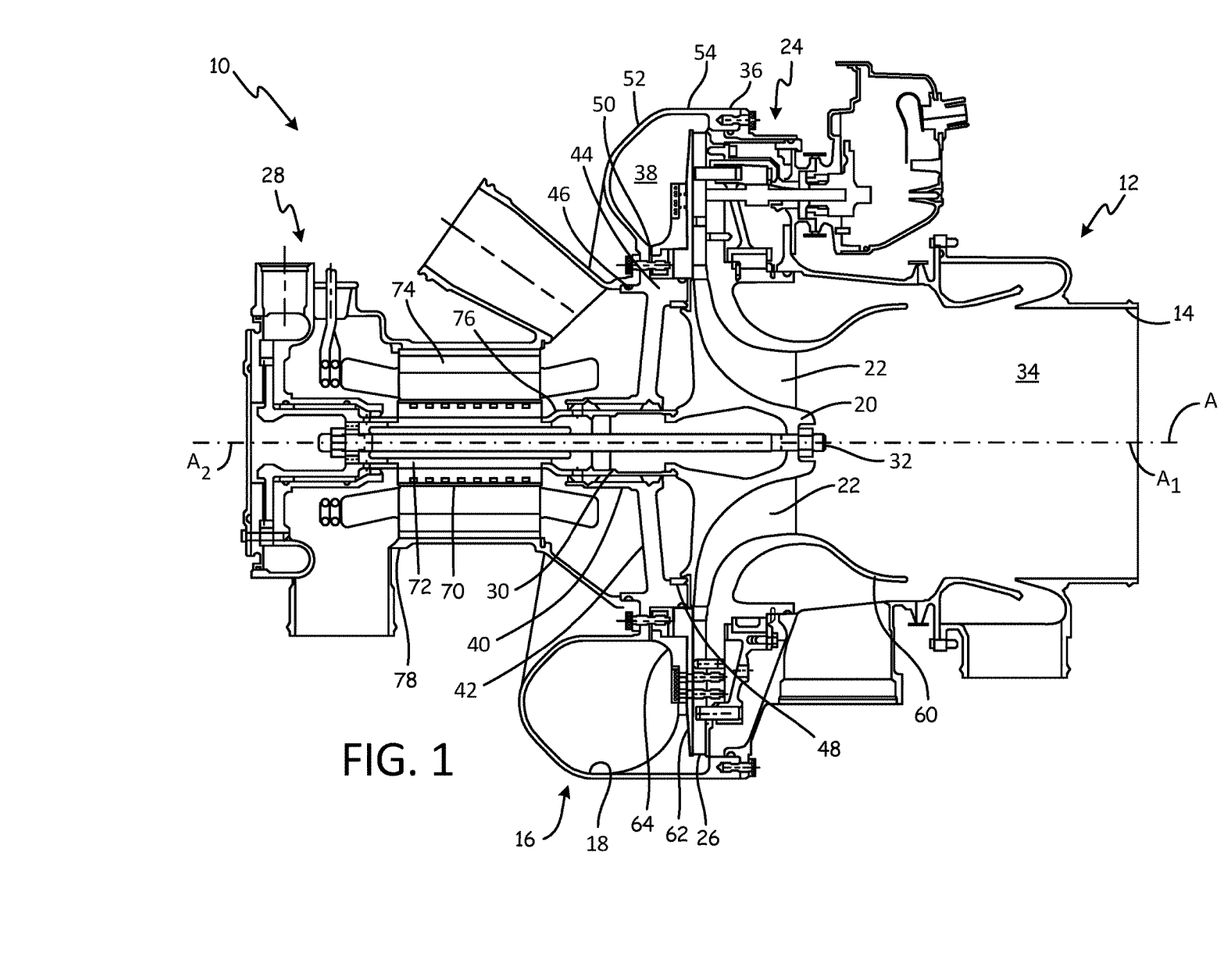
FIG. 1 is cross-sectional view of a cabin air compressor.

FIG. 1 is a cross-sectional view of cabin air compressor 10. Cabin air compressor 10 includes compressor inlet housing 12 with compressor inlet 14, compressor outlet housing 16 with compressor outlet 18, compressor rotor 20 with blades 22, variable diffuser 24 with vanes 26, electric motor 28, journal bearing 30, and tie rod 32. Compressor inlet housing 12 includes compressor inlet 14, inlet chamber 34, and inlet rim 36. Compressor outlet housing 16 includes compressor outlet 18, outlet volute 38, journal bearing support sleeve 40, web 42, annular support ring 44 (which includes motor mount flange 46, rotor seal flange 48, and annular mounting region 50), outlet volute wall 52, and outlet rim 54. Variable diffuser 24 includes vanes 26, shroud 60, backing plate 62, and mounting plate 64. Electric motor 28 includes motor rotor 70 with rotor shaft 72, motor stator 74, drive shaft 76, and motor housing 78. Also shown in FIG. 1 is axis A having first end $A_1$ and second end $A_2$.

Compressor inlet housing 12 is connected to variable diffuser 24 and to the $A_1$ facing side of compressor outlet housing 16. Compressor inlet 14 is positioned at the $A_1$ facing end of compressor inlet housing 12. The outer boundaries of inlet chamber 34 are defined by compressor inlet housing 12. Inlet rim 36 is positioned radially outward from axis A and is connected to outlet rim 54.

Compressor outlet housing 16 is connected to variable diffuser 24, the $A_2$ facing end of compressor inlet housing 12, and the $A_1$ facing end of electric motor 28. Compressor outlet 18 is positioned radially away from axis A. The outer boundaries of outlet volute 38 are defined by compressor outlet housing 16. Journal bearing support sleeve 40 is connected to journal bearing 30 and web 42. Web 42 is connected to journal bearing support sleeve 40 and annular support ring 44. Annular support ring 44 is connected to compressor rotor 20 motor mount flange 46, rotor seal flange 48, annular mounting region 50, and outlet volute wall 52. Motor mount flange 46 is connected to motor housing 78. Annular mounting region 50 is connected to variable diffuser 24. Compressor rotor 20 is connected to blades 22, compressor outlet housing 16, and tie rod 32.

Variable diffuser 24 is connected to compressor inlet housing 12 and compressor outlet housing 16. Shroud 40 is connected to compressor inlet housing 12. Vanes 22 are positioned between shroud 60 and backing plate 62. Backing plate 62 is connected to mounting plate 64.

Electric motor 28 is connected to the $A_2$ facing end of compressor outlet housing 16 and to tie rod 32. Motor rotor 70 rotates within motor stator 74. Rotor shaft 72 of motor rotor 70 is connected to drive shaft 76. Drive shaft 76 is connected to compressor rotor 20. Tie rod 32 is connected to compressor rotor 20, electric motor 28, and journal bearing 30. Tie rod 32 is centered on axis A.

Tie rod 32 axially restrains and aligns electric motor 28, compressor rotor 20, compressor outlet housing 16, and compressor inlet housing 12. Journal bearing 30 supports tie rod 32 and permits rotation of drive shaft 76 about axis A. Electric motor 28 rotates motor rotor 70, which in turn rotates rotor shaft 72. Rotor shaft 72 of motor rotor 70 drives drive shaft 76, which in turn drives compressor rotor 20 with blades 22. The rotation of compressor rotor 20 draws air into inlet chamber 34 of compressor inlet housing 12 at compressor inlet 14. The air in inlet chamber 34 is compressed by compressor rotor 20. The compressed air is then routed to variable diffuser 24. Vanes 26 can be positioned to allow air to flow through variable diffuser 24 without compressing the air. Vanes 26 can also be positioned to further compress the air flowing through variable diffuser 24 before that air enters outlet volute 38. The compressed air leaves variable diffuser 24 and is routed through outlet volute 38 before exiting compressor outlet 18.

Figure 2A:
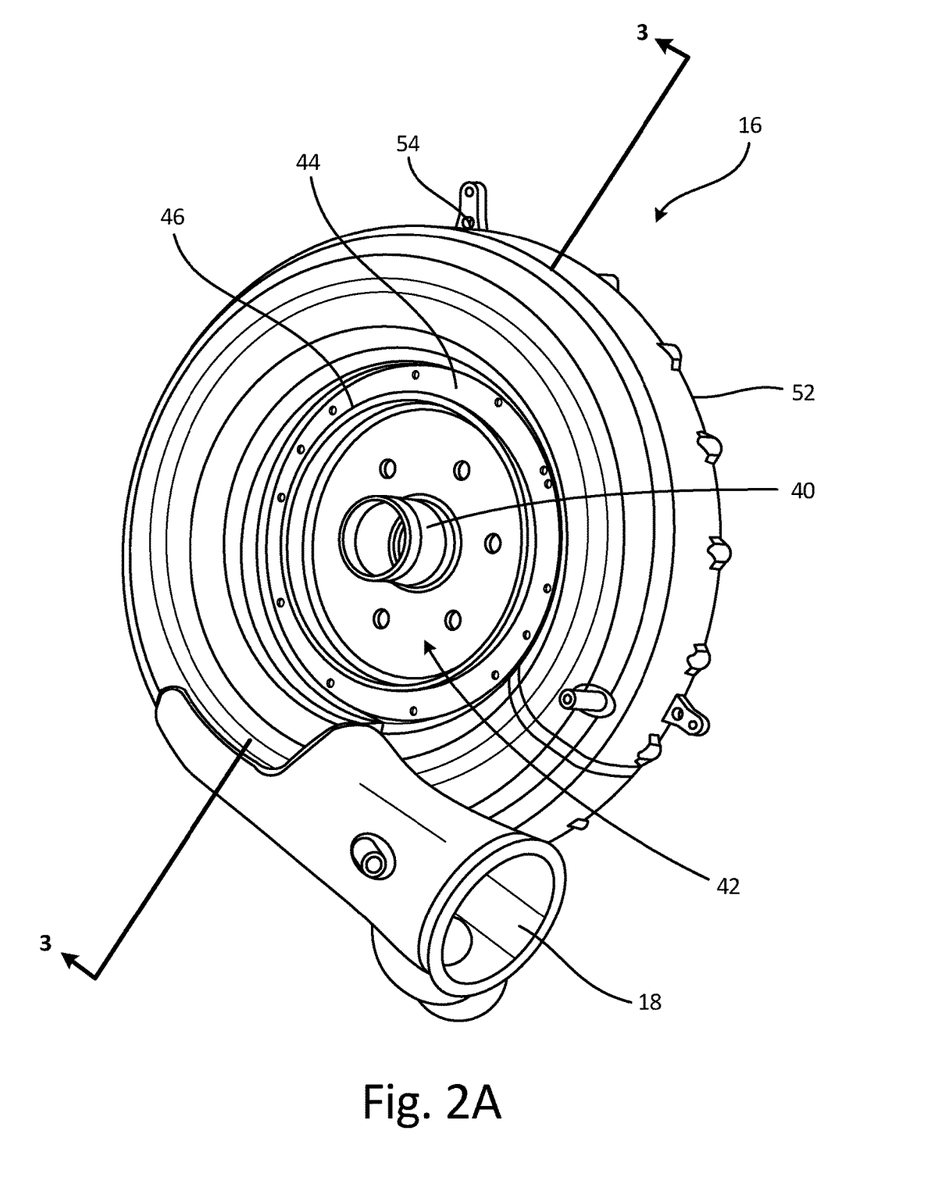
FIG. 2A is perspective view of a motor facing end of a compressor outlet housing for the cabin air compressor.
Figure 2B:
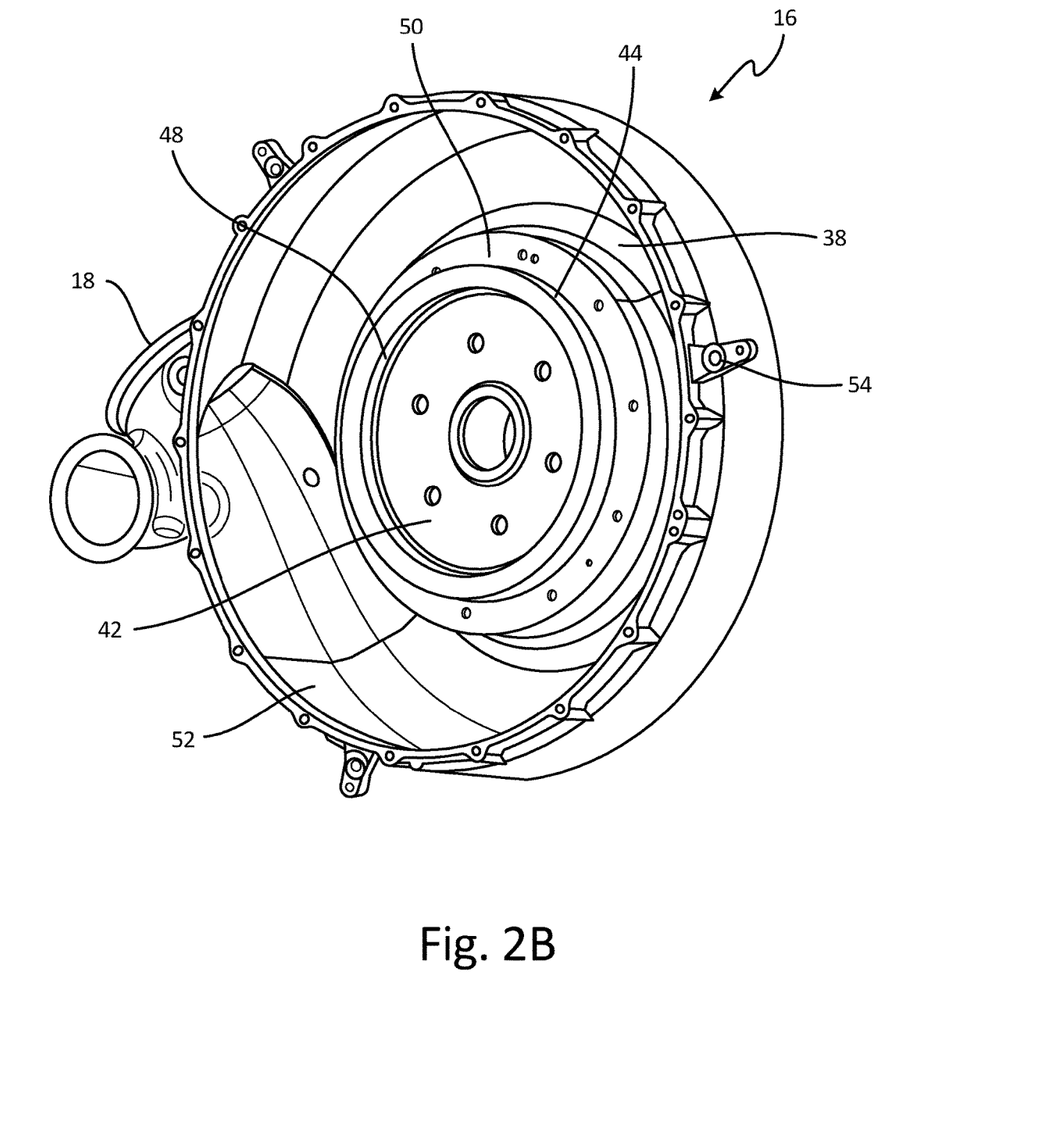
FIG. 2B is a perspective view of a compressor inlet facing end of the compressor outlet housing.

FIG. 2A is a perspective view of the motor facing end of compressor outlet housing 16. FIG. 2B is a perspective view of the compressor inlet facing end of compressor outlet housing 16. Compressor outlet housing 16 is aligned with axis A and includes compressor outlet 18, outlet volute 38, journal bearing support sleeve 40, web 42, annular support ring 44 (which includes motor mount flange 46, rotor seal flange 48, and annular mounting region 50), outlet volute wall 52, and outlet rim 54. Journal bearing support sleeve 40 is positioned at the center of compressor outlet housing 16. Journal bearing support sleeve 40 is connected to web 42. Web 42 extends between and connects journal bearing support sleeve 40 and annular support ring 44. Annular support ring 44 is connected to the radial outward end of web 42. Annular support ring 44 is also connected to the radial inward end of outlet volute wall 52 at the radial outward end of annular mounting region 50. Outlet volute wall 52 is connected to outlet rim 54.

Journal bearing support sleeve 40 provides support to journal bearing 30. Web 42 connects to annular support ring 44. Annular support ring 44 connects to motor mount flange 46, rotor seal flange 48, annular mounting region 50, and outlet volute wall 52. Rotor seal flange 55 connects annular mounting region 50 to seal land 80 (shown in FIG. 3). Motor mount flange 46 aligns compressor outlet housing 16 to motor housing 78. Annular mounting region 50 connects compressor outlet housing 16 to mounting plate 64 of variable diffuser 24. Outlet volute wall 52 defines the outer contours of outlet volute 38. Outlet rim 54 connects outlet housing 16 to compressor inlet housing 12 at inlet rim 36.

Figure 3:
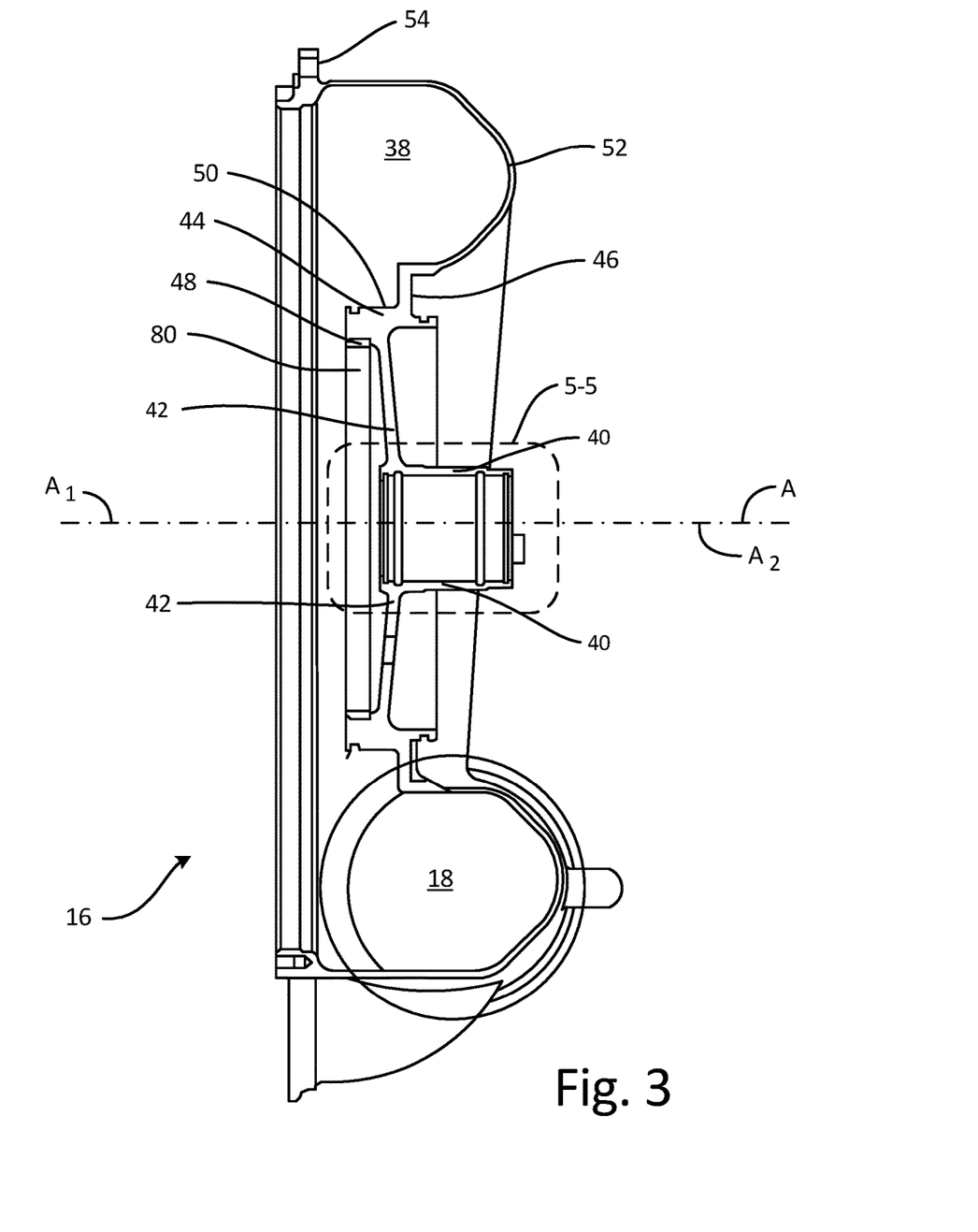
FIG. 3 is a cross-sectional view of a compressor outlet housing of a cabin air compressor taken along section 3-3 of FIG. 2A.

FIG. 3 is a cross-sectional view of compressor outlet housing 16 in the cabin air compressor 10 taken along cross-section line 3-3 of FIG. 2A. Compressor outlet housing 16 includes compressor outlet 18, outlet volute 38, journal bearing support sleeve 40, web 42, annular support ring 44, motor mount flange 46, rotor seal flange 48, annular mounting region 50, outlet volute wall 52, outlet rim 54, and seal land 80. FIG. 3 also includes dashed line 5-5 and axis A having first end $A_1$ and second end $A_2$. Outlet rim 54 is positioned at a radially outward end from axis A. Annular support ring 44 is positioned radially inward from outlet rim 54 and is connected to motor mount flange 46, rotor seal flange 48, annular mounting region 50, and outlet volute wall 52. Web 42 is positioned radially inward from annular support ring 44 and is connected to journal bearing support sleeve 40. Seal land 80 is positioned axially toward first end $A_1$ relative to journal bearing support sleeve 40 and is connected to rotor seal flange 48. Seal land 80 minimizes leakage from compressor rotor 20. It is more cost efficient to replace journal bearing support sleeve 40 and seal land 80 than it is to replace outlet compressor housing 16 in its entirety.

Figure 4:
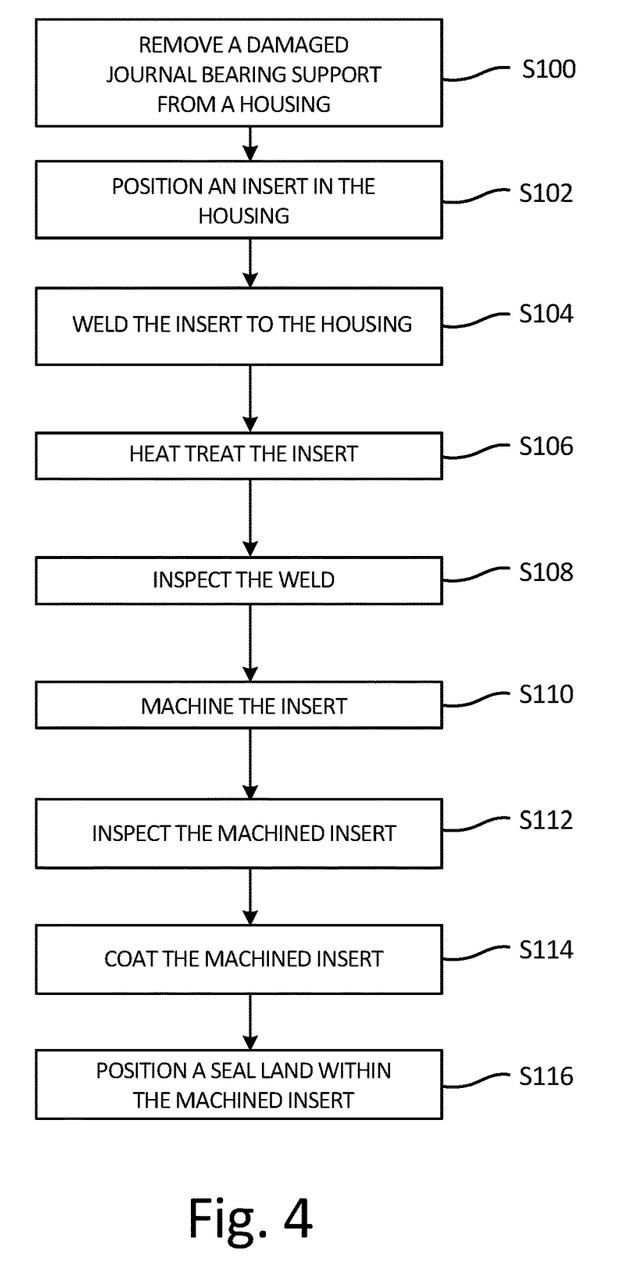
FIG. 4 is a flowchart illustrating of a method of repairing the compressor outlet housing.
Figure 5:
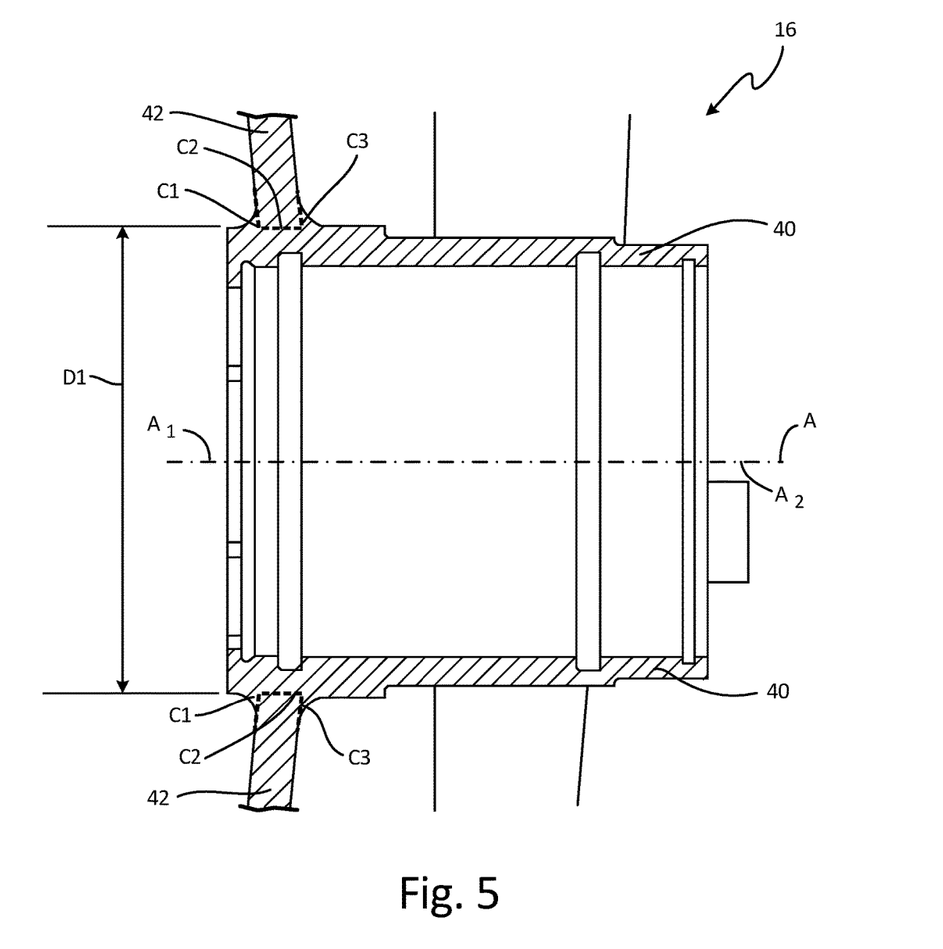
FIG. 5 is an enlarged cross-sectional view of a journal bearing support sleeve in the compressor outlet housing indicated at the dashed line 5-5 of FIG. 3.
Figure 6:
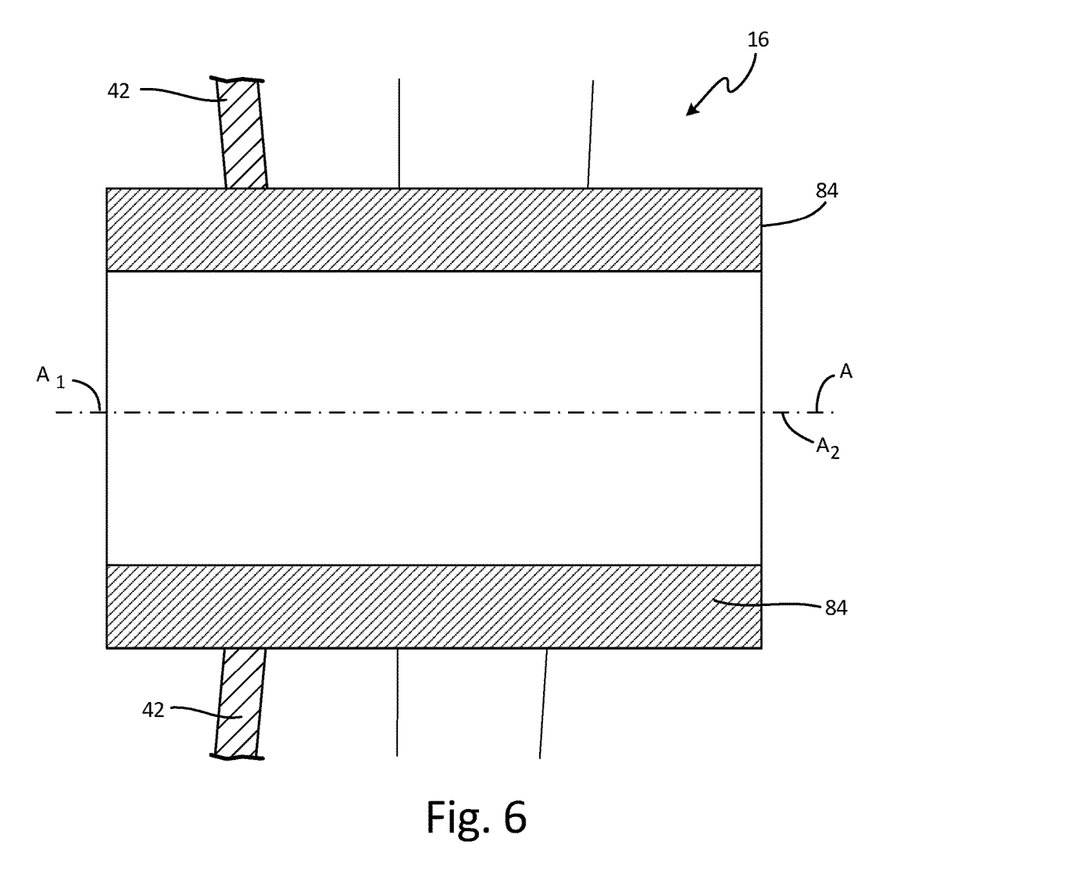
FIG. 6 is a cross-sectional view of a cylindrical insert positioned in the compressor outlet housing.
Figure 7:
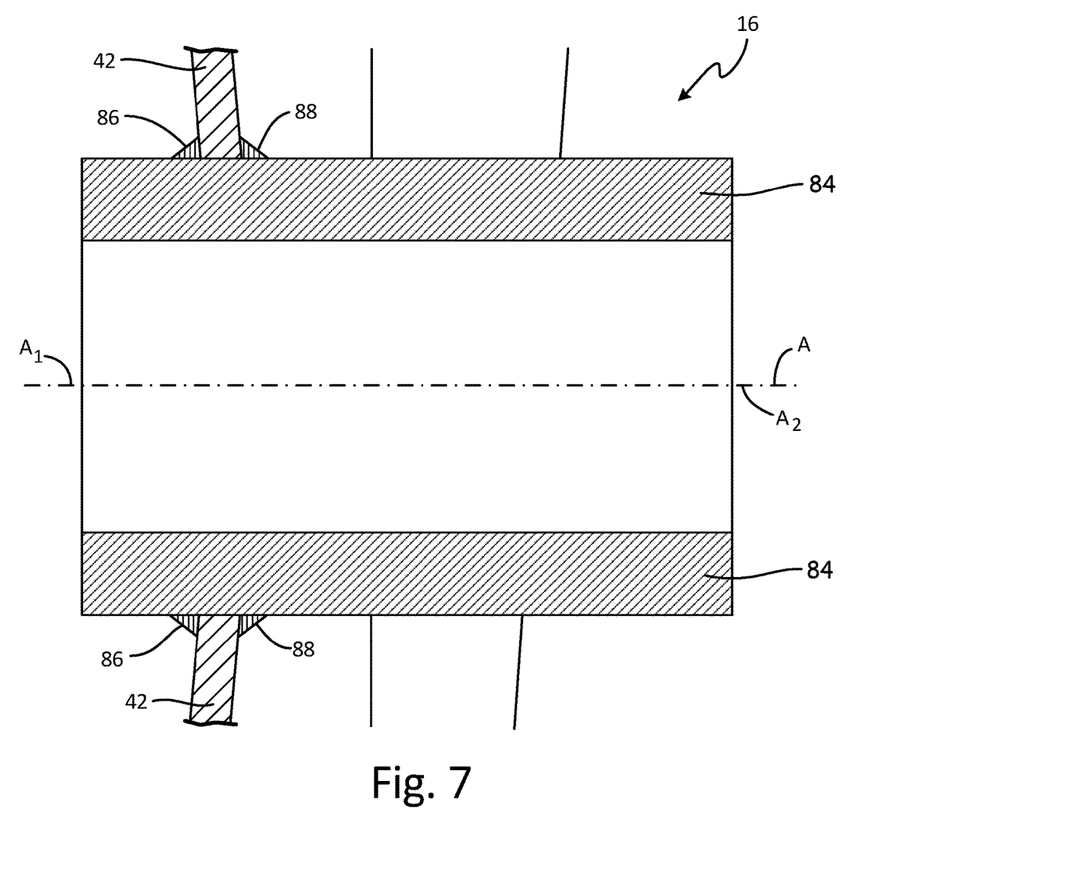
FIG. 7 is a cross-sectional view of the cylindrical insert welded to the compressor outlet housing.
Figure 8:
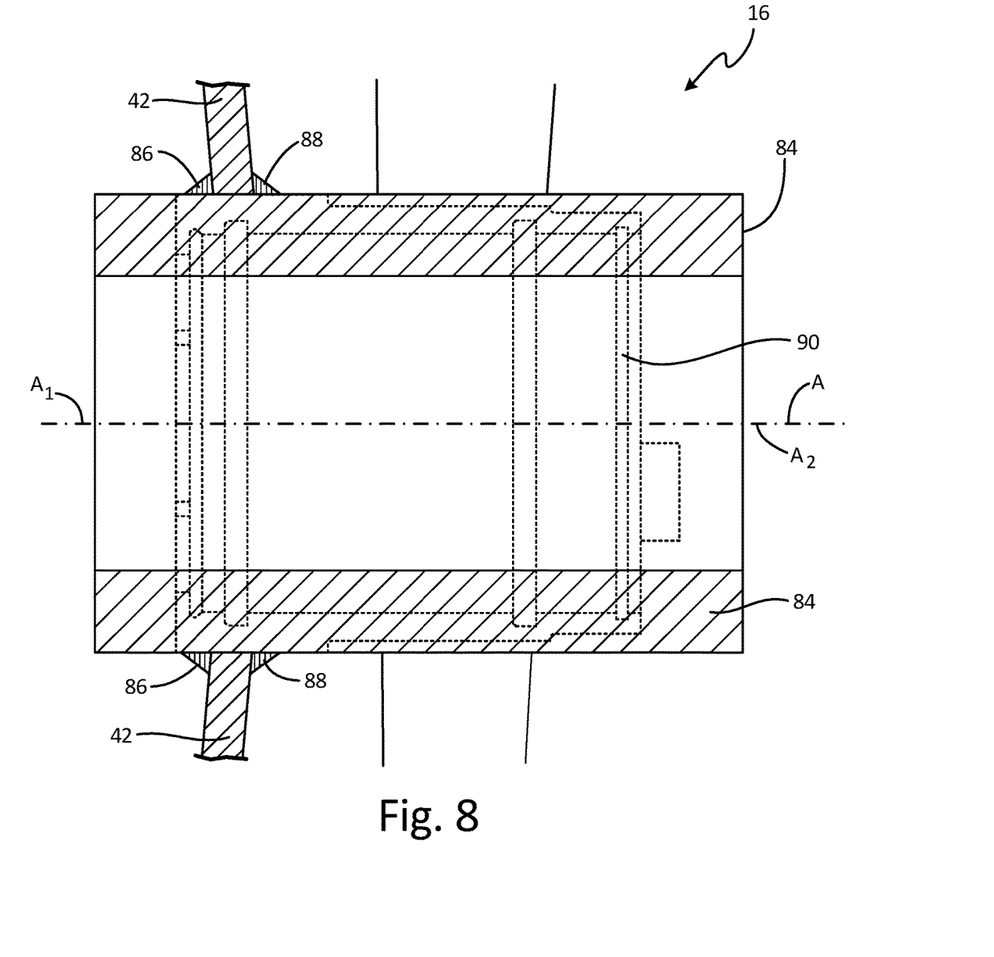
FIG. 8 is a cross-sectional view showing phantom lines representing location of machined surfaces to be formed on the cylindrical insert welded to the compressor outlet housing.
Figure 9:
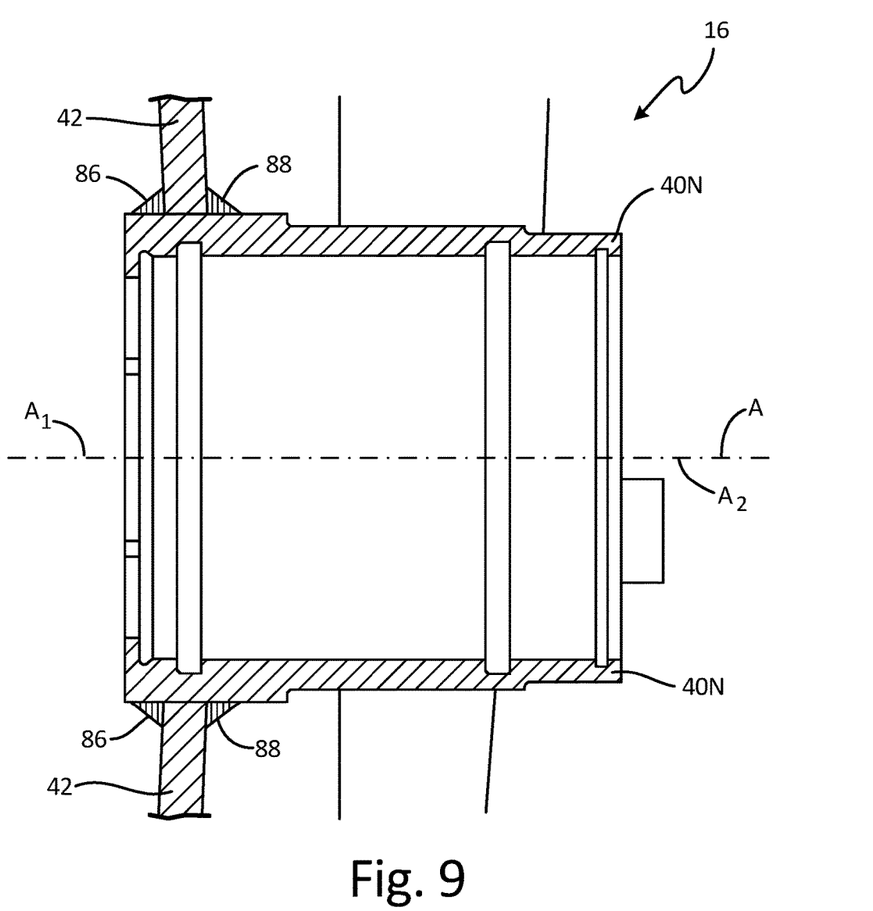
FIG. 9 is a cross-sectional view of the machined cylindrical insert in the compressor outlet housing after the cylindrical insert has been machined to form a new journal bearing support sleeve welded to the compressor outlet housing.

FIG. 4 is a flowchart illustrating of a method of repairing the compressor outlet housing 16 when journal bearing support sleeve 40 is worn or damaged. FIG. 4 includes steps S100, S102, S104, S106, S108, S110, S112, S114, and S116 to show how compressor outlet housing 16 can be repaired at journal bearing support sleeve 40. FIGS. 5-8 illustrate some of the steps shown in the flow chart of FIG. 4. FIG. 5 is an enlarged cross-sectional view of a journal bearing support sleeve 40 in compressor outlet housing 16 indicated at the dashed line 5-5 of FIG. 3. FIG. 6 is a cross-sectional view of cylindrical insert 84 positioned in compressor outlet housing 16. FIG. 7 is a cross-sectional view of cylindrical insert 84 welded to compressor outlet housing 16. FIG. 8 is a cross-sectional view showing with phantom lines 90 the final machined surfaces to be formed on cylindrical insert 84 to create a new journal bearing support sleeve that is welded to compressor outlet housing 16. FIG. 9 is a cross-sectional view of the machined cylindrical insert 84 which now forms new journal bearing support sleeve 40N in compressor outlet housing 16.

Step S100 includes removing a worn or damaged journal bearing support sleeve 40 from compressor outlet housing 16, as seen in FIG. 5. At step S100, compressor outlet housing 16 includes web 42 and journal bearing support sleeve 40. FIG. 5 also includes diameter $D_1$ and cuts $C_1$, $C_2$, and $C_3$. In one example, diameter $D_1$ is at or between 2.690 and 2.710 inches (68,326 and 68,834 micrometers) in length. Cut $C_1$ is a circumferential cut about journal bearing support sleeve 40 at diameter $D_1$. Cuts $C_2$ and $C_3$ are positioned to ensure that web 42 has a minimum thickness of 0.220 inches (5,588 micrometers) between cuts $C_2$ and $C_3$. Cuts $C_2$ and $C_3$ are circumferential cuts about journal bearing support sleeve 40. Cuts $C_1$, $C_2$, and $C_3$ permit removal of journal bearing support sleeve 40 without damaging web 42 of compressor outlet housing 16. Cuts $C_1$, $C_2$, and $C_3$ also ensure that web 42 can support cylindrical insert 84 after removing journal bearing support sleeve 40. In other embodiments, cuts can be performed in any order or can include a fewer or greater number of cuts to remove journal bearing support sleeve 40. In one embodiment, journal bearing support sleeve 40 can be removed from compressor outlet housing 16 by milling. In another embodiment, journal bearing support sleeve 40 can be removed from compressor outlet housing 16 by jig boring.

Step S102 includes positioning cylindrical insert 84 in compressor outlet housing 16 at the site where journal bearing support sleeve 40 was removed, as seen in FIG. 5. At step S102, compressor outlet housing 16 includes web 42 and cylindrical insert 84. Cylindrical insert 84 is positioned so that it has a diametral interference at or between 0.001 and 0.003 inches (25.4 and 76.2 micrometers) with the inner diameter of web 42. Cylindrical insert 84 comprises a length and inner and outer diameter suitable for machining at step S114. Positioning cylindrical insert 84 ensures proper alignment for welding and machining steps S104 and S110, respectively. In one embodiment, cylindrical insert 84 can comprise aluminum or an aluminum alloy, such as Aerospace Specification Metals, Inc. (ASM) standard 6061-T6.

Step S104 includes welding cylindrical insert 84 to compressor outlet housing 16 at web 42, as seen in FIG. 6. At step S104, compressor outlet housing 16 includes web 42, cylindrical insert 84, and fillet welds 86 and 88. Fillet welds 86 and 88 are positioned where web 42 and cylindrical insert 84 meet. Fillet welds 86 and 88 extend circumferentially about cylindrical insert 84 on opposite sides of web 42. Welding cylindrical insert 84 to web 42 holds cylindrical insert 84 in proper alignment. In one embodiment, cylindrical insert 84 can be fusion welded, as in American Welding Standard specification D17. Suitable fillet welds can comprise aluminum or an aluminum alloy, such as SAE International aluminum standards AMS 4190 or AMS 4181 fillers. In another embodiment, cylindrical insert 84 can be electron beam welded to web 42. In other embodiments, any appropriate welding technique can be used.

Step S106 includes heat treating cylindrical insert 84. Heat treating relieves thermal stresses that can occur in cylindrical insert 84 from welding at step S104. In one embodiment, cylindrical insert 84 can be heat treated for 2 hours at a temperature at or between 300 and 320 degrees Fahrenheit (149 and 160 degrees Celsius) and then cooled.

Step S108 includes inspecting cylindrical insert 84 for cracks or surface defects. In one embodiment, the weld of cylindrical insert 84 and web 42 is inspected using penetrant inspection.

Step S110 includes machining internal and external surfaces of cylindrical insert 84, as seen in FIGS. 7 and 8. At step S110, compressor outlet housing 16 includes web 42, cylindrical insert 84, new journal bearing support sleeve 40N, and fillet welds 86 and 88. FIG. 7 also includes phantom journal bearing support lines 70. Phantom journal bearing support lines 70 show where cylindrical insert 84 will be machined according to step S110. FIG. 8 is a cross-sectional view of the machined cylindrical insert 84 in compressor outlet housing 16. Cylindrical insert 84 connects with fillet welds 86 and 88 and web 42. Leaving fillet welds 86 and 88, cylindrical insert 84 can otherwise be machined to the original dimension of journal bearing support sleeve 40. Machining cylindrical insert 84 according to the dimensions of journal bearing support sleeve 40 to form new journal bearing support sleeve 40N ensures that it can support journal bearing 30. It is also advantageous because journal bearing support sleeve 40 can be replaced with journal bearing support sleeve 40N so that replacing compressor outlet housing 16 in its entirety is not required. All machining to convert cylindrical insert 84 to new journal bearing support sleeve 40N has been performed with cylindrical insert 84 fixed to outlet housing 16. As a result, alignment of the machined surfaces of new journal bearing support sleeve 40N with respect to the other structural components of outlet housing 16 can be assured. When compressor outlet housing 16 is reinstalled, new journal bearing support sleeve 40N will be in alignment with axis A.

Step S112 includes inspecting cylindrical insert 84 for cracks or surface defects. Inspecting new journal bearing support sleeve 40N after machining at step S110 can reveal cracks or defects that were not on the surface prior to machining at step S100. In one embodiment, penetrant inspection can be used for inspection at step S112.

Step S114 includes new journal bearing support sleeve 40N. At step S114, new journal bearing support sleeve 40N is subject to a conversion coat to protect the aluminum or aluminum alloy from corrosion. The conversion coat provides new journal bearing support sleeve 40N with a pre-oxidized layer for corrosion protection. In one embodiment, the pre-oxidized layer can have a layer depth of approximately 0.1 inches (2,540 micrometers).

Step S116 includes inspecting and replacing seal land 80, if necessary. Seal land 80, shown in FIG. 3, is positioned axially toward first end $A_1$ relative to web 42 and connects to rotor seal flange 48 and minimizes leakage from compressor rotor 20. Seal land 80 can comprise a polyimide-based polymer, such as Vespel®.

Discussion of Possible Embodiments

The following are non-exclusive descriptions of possible embodiments of the present invention.

A method for repairing a cabin air compressor outlet housing according to an exemplary embodiment of this disclosure, among other possible things, includes removing a journal bearing support sleeve in a cabin air compressor outlet housing, positioning a cylindrical insert within the cabin air compressor outlet housing, wherein the cylindrical insert has an outer diameter greater than an outer diameter of at least one portion of the removed journal bearing support sleeve, an inner diameter less than an inner diameter of at least one portion of the removed journal bearing support sleeve, and a length greater than a length of the removed journal bearing support sleeve, welding the cylindrical insert to the cabin air compressor outlet housing, and machining the welded cylindrical insert to form a replacement journal bearing support sleeve.

The method for repairing a cabin air compressor outlet housing of the preceding paragraph can optionally include, additionally and/or alternatively, any one or more of the following features, configurations and/or additional components:

The method wherein the welded cylindrical insert includes machining at least one portion of the outer surface of the welded cylindrical insert.

The method wherein machining the welded cylindrical insert includes machining at least one portion of the inner surface of the welded cylindrical insert.

The method wherein machining the welded cylindrical insert includes machining at least one of the end surfaces of the welded cylindrical insert.

The method further comprises positioning a seal land within the cabin air compressor outlet housing.

The method further comprises heat treating the welded cylindrical insert prior to machining the welded cylindrical insert.

The method further comprises inspecting the weld for defects prior to machining the welded cylindrical insert.

The method further comprises inspecting the replacement journal bearing support sleeve for defects prior to positioning the seal land.

The method further comprises coating the replacement journal bearing support sleeve prior to positioning the seal land.

A cabin air compressor housing according to an exemplary embodiment of this disclosure, among other possible things, includes a volute wall attached to and extending radially outward from an annular support ring, a web extending radially inward from the annular support ring, and a journal bearing support sleeve welded to a radial innermost portion of the web, wherein the journal bearing support sleeve was formed by machining an oversized cylindrical insert to final dimensions of the journal bearing support after the oversized cylindrical insert had been welded to the web.

The cabin air compressor housing of the preceding paragraph can optionally include, additionally and/or alternatively, any one or more of the following features, configurations and/or additional components:

The cabin air compressor housing wherein machining the oversized cylindrical insert includes machining at least one portion of an outer surface of the oversized cylindrical insert.

The cabin air compressor housing wherein machining the oversized cylindrical insert includes machining at least one portion of an inner surface of the oversized cylindrical insert.

The cabin air compressor housing wherein machining the oversized cylindrical insert includes machining end surfaces of the oversized cylindrical insert.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for repairing a cabin air compressor outlet housing comprising:
   removing a journal bearing support sleeve in a cabin air compressor outlet housing;
   positioning a cylindrical insert within the cabin air compressor outlet housing, wherein the cylindrical insert has an outer diameter greater than an outer diameter of at least one portion of the removed journal bearing support sleeve, an inner diameter less than an inner diameter of at least one portion of the removed journal bearing support sleeve, and a length greater than a length of the removed journal bearing support sleeve;
   welding the cylindrical insert to the cabin air compressor outlet housing;
   heat treating the welded cylindrical insert;
   machining the welded cylindrical insert, after the cylindrical insert has been welded and heat treated, to form a replacement journal bearing support sleeve with machined surfaces that are aligned with the cabin air compressor outlet housing, wherein machining the welded cylindrical insert comprises:
      machining at least one portion of an outer surface of the welded cylindrical insert;
      machining at least one portion of an inner surface of the welded cylindrical insert; and
      machining at least one end surface of the welded cylindrical insert; and
   positioning a seal land within the cabin air compressor outlet housing.

2. The method of claim 1, further comprising inspecting a weld for defects prior to machining the welded cylindrical insert.

3. The method of claim 1, further comprising inspecting the replacement journal bearing support sleeve for defects prior to positioning the seal land.

4. The method of claim 1, further comprising coating the replacement journal bearing support sleeve prior to positioning the seal land.

5. The method of claim 1, wherein the cabin air compressor housing comprises:
   a volute wall attached to and extending radially outward from an annular support ring; and
   a web extending radially inward from the annular support ring, wherein the replacement journal bearing support sleeve is welded to a radial innermost portion of the web, wherein the replacement journal bearing support sleeve is formed by machining the cylindrical insert to final dimensions of the journal bearing support sleeve after the cylindrical insert has been welded to the web.

6. The method of claim 5, wherein machining the cylindrical insert includes machining at least one portion of an outer surface of the cylindrical insert.

7. The method of claim 5, wherein machining the cylindrical insert includes machining at least one portion of an inner surface of the cylindrical insert.

8. The method of claim 5, wherein machining the cylindrical insert includes machining end surfaces of the cylindrical insert.

9. A method for repairing a cabin air compressor outlet housing comprising:
   removing a journal bearing support sleeve in a cabin air compressor outlet housing;
   positioning a cylindrical insert within the cabin air compressor outlet housing, wherein the cylindrical insert has an outer diameter greater than an outer diameter of at least one portion of the removed journal bearing support sleeve, an inner diameter less than an inner diameter of at least one portion of the removed journal bearing support sleeve, and a length greater than a length of the removed journal bearing support sleeve;
   welding the cylindrical insert to the cabin air compressor outlet housing; and
   machining the welded cylindrical insert, after the cylindrical insert has been welded, to form a replacement journal bearing support sleeve with machined surfaces that are aligned with the cabin air compressor outlet housing, wherein machining the welded cylindrical insert comprises:
      machining at least one portion of an outer surface of the welded cylindrical insert;
      machining at least one portion of an inner surface of the welded cylindrical insert; and
      machining at least one end surface of the welded cylindrical insert.

10. The method of claim 9, further comprising positioning a seal land within the cabin air compressor outlet housing.

11. The method of claim 9, further comprising heat treating the welded cylindrical insert prior to machining the welded cylindrical insert.

12. The method of claim 9, further comprising inspecting the welded cylindrical insert for defects prior to machining the welded cylindrical insert.

13. The method of claim 9, further comprising inspecting the replacement journal bearing support sleeve for defects prior to positioning the seal land.

14. The method of claim 9, further comprising coating the replacement journal bearing support sleeve prior to positioning the seal land.

* * * * *